United States Patent
Tsukamoto et al.

(10) Patent No.: US 10,584,742 B2
(45) Date of Patent: Mar. 10, 2020

(54) ROLLING BEARING

(71) Applicant: NSK LTD., Tokyo (JP)

(72) Inventors: Masaumi Tsukamoto, Fujisawa (JP);
Hironori Mizuki, Fujisawa (JP);
Masato Nakajima, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/079,844

(22) PCT Filed: Feb. 23, 2018

(86) PCT No.: PCT/JP2018/006824
§ 371 (c)(1),
(2) Date: Aug. 24, 2018

(87) PCT Pub. No.: WO2018/155659
PCT Pub. Date: Aug. 30, 2018

(65) Prior Publication Data
US 2019/0360523 A1 Nov. 28, 2019

(30) Foreign Application Priority Data
Feb. 23, 2017 (JP) .................................. 2017-031662

(51) Int. Cl.
F16C 19/06 (2006.01)
F16C 19/26 (2006.01)
(Continued)

(52) U.S. Cl.
CPC .............. F16C 19/06 (2013.01); F16C 19/26 (2013.01); F16C 33/785 (2013.01);
(Continued)

(58) Field of Classification Search
CPC .......... F16C 19/06; F16C 19/26; F16C 33/78; F16C 33/80; F16C 33/805; F16C 33/783;
(Continued)

(56) References Cited

U.S. PATENT DOCUMENTS 3,597,030 A * 8/1971 Hallerback ......... F16C 33/7846
384/488
5,332,232 A * 7/1994 Kurose ................. F16C 33/783
277/551

(Continued)

FOREIGN PATENT DOCUMENTS

JP 7-279979 A 10/1995
JP 11-2252 A 1/1999
(Continued)

OTHER PUBLICATIONS

International Search Report (PCT/ISA/210) dated Apr. 24, 2018 issued by the International Searching Authority in International Application No. PCT/JP2018/006824.
(Continued)

Primary Examiner — Marcus Charles
(74) Attorney, Agent, or Firm — Sughrue Mion, PLLC

(57) ABSTRACT

A rolling bearing includes an outer ring, a plurality of rolling elements, a cage configured to rollably hold the plurality of rolling elements, and a shield. An inner peripheral surface of at least one axial end portion of the outer ring is provided with a large-diameter part, which has a diameter larger than an inner diameter of the outer ring, opens outward in an axial direction, and has an axial width greater than an axial width of the shield. An outer shape surface of the shield is configured by a plurality of circular arcs having a same central angle and equidistantly arranged on a circumference and a plurality of chords connecting adjacent circular arcs each other. The shield is press-fitted and fixed to the large-diameter part.

9 Claims, 7 Drawing Sheets

(51) Int. Cl.
F16C 33/80 (2006.01)
F16C 33/78 (2006.01)
F16C 33/58 (2006.01)
F16J 15/447 (2006.01)

(52) U.S. Cl.
CPC .......... F16C 33/7843 (2013.01); F16C 33/80 (2013.01); *F16C 33/586* (2013.01); *F16C 33/78* (2013.01); *F16C 2226/12* (2013.01); *F16J 15/447* (2013.01)

(58) Field of Classification Search
CPC .............. F16C 2226/12; F16C 2226/74; F16C 2240/40; F16C 33/7843; F16C 33/785; F16J 15/447; G11B 17/022
USPC ........ 384/456, 477, 480; 277/397, 412, 547; 360/99.12
See application file for complete search history.

(56) References Cited

U.S. PATENT DOCUMENTS

| | | | | |
|---|---|---|---|---|
| 5,470,158 A | * | 11/1995 | McLarty | F16C 33/7856 |
| | | | | 277/397 |
| 5,577,845 A | * | 11/1996 | Ishida | F16C 33/785 |
| | | | | 277/410 |
| 7,011,452 B2 | * | 3/2006 | Suzuki | F16C 33/783 |
| | | | | 277/411 |
| 8,279,553 B2 | * | 10/2012 | Hasegawa | F16C 19/06 |
| | | | | 360/99.08 |
| 2002/0191877 A1 | | 12/2002 | Suzuki et al. | |
| 2004/0184690 A1 | | 9/2004 | Suzuki et al. | |

FOREIGN PATENT DOCUMENTS

| | | |
|---|---|---|
| JP | 11-351263 A | 12/1999 |
| JP | 2001-27253 A | 1/2001 |
| JP | 2008-57635 A | 3/2008 |

OTHER PUBLICATIONS

Written Opinion (PCT/ISA/237) dated Apr. 24, 2018 issued by the International Searching Authority in International Application No. PCT/JP2018/006824.

* cited by examiner

ROLLING BEARING

CROSS REFERENCE TO RELATED APPLICATIONS

This U.S. Application is a 371 of International Application No. PCT/JP2018/006824 filed on Feb. 23, 2018, which is related to Japanese Application No. 2017-031662 filed on Feb. 23, 2017.

TECHNICAL FIELD

The present invention relates to a rolling bearing to which a shield for sealing a bearing inside from a bearing outside is mounted, and particularly, to a mounting technology of the shield.

RELATED ART

In the related art, as a grease lubrication bearing, a rolling bearing to which a metallic shield is mounted so as to keep grease in a bearing and to prevent introduction of foreign matters has been known (for example, refer to Patent Document 1). As an example, a sectional view of main parts of the rolling bearing of the related art is shown in FIGS. 8A and 8B. A rolling bearing 10 includes an outer ring 11 an inner ring 12, a plurality of balls 13 provided between the inner and outer rings 11, 12, a cage 17 configured to rollably hold the balls 13, and metallic shields 14, 15 for dust proofing and the like. A side surface of the outer ring 11 is formed with metallic shield fixing grooves 11a, 11b having an outward expanded shape from an axially outer side toward an axially inner side.

Subsequently, a method of mounting the metallic shields 14, 15 to the rolling bearing 10 is described. As shown in FIG. 8A, the metallic shield 14 bent in advance is contacted to the groove 11a. Then, as shown in FIG. 8B, the metallic shield 14 is mounted and fixed to the fixing groove 11a by using swaging deformation with a press machine or the like. Similarly, the other metallic shield 15 is also mounted and fixed to the fixing groove 11b.

According to the configuration of mounting and fixing the metallic shields, for the secure mounting, it is necessary to provide the metallic shield fixing groove of the outer ring with a groove for forming an outward expanded space from an outer side toward an inner side. However, there is no axial margin for providing the groove at the thin outer ring (the outer ring of which an axial width is narrow), so that it is not possible to mount and fix the metallic shield to the rolling bearing.

In order to solve the above problem, Patent Document 2 discloses a technology of mounting and fixing a washer-shaped shield to the outer ring by laser welding. However, according to this technology, the cost increases as a result of the laser welding. Also, a shape of a bearing raceway is likely to collapse due to the welding. Therefore, a method of mounting and fixing the washer-shaped shield by press fitting in which a shield outer-diameter surface and an outer ring inner-diameter surface are used as fitting parts is considered. However, when press fitting the shield, particularly, to the thin outer ring (the outer ring having a small radial thickness of which a dimension difference between outer and inner diameters is small), the outer ring is likely to be deformed.

Also, Patent Document 3 discloses a bearing sealing device in which an outer periphery of a metallic annular plate is provided at six equidistantly spaced parts with concave cutouts for allowing the annular plate to be radially bent and the metallic annular plate is fitted with being bent to a circumferential groove of an outer ring. In this case, however, it is necessary to provide the cutout having a dimension allowing the bending, in correspondence to a radial dimension of an inner wall surface of an outer side of the circumferential groove, which may influence rigidity of the annular plate when used.

CITATION LIST

Patent Documents

Patent Document 1: JP-A-2001-027253
Patent Document 2: JP-A-H11-351263
Patent Document 3: JP-A-H07-279979

SUMMARY OF THE INVENTION

Problems to be Solved by the Invention

The present invention has been made in view of the above situations, and an object thereof is to provide a rolling bearing capable of mounting a metallic shield to even an outer ring having a small width of which an axial width is narrow or an outer ring having a small thickness of which a radial width is narrow.

Means for Solving the Problems

The object of the present invention is solved by a rolling bearing comprising an outer ring, an inner ring part, a plurality of rolling elements, a cage configured to rollably hold the plurality of rolling elements, and a shield. An inner peripheral surface of at least one axial end portion of the outer ring is provided with a large-diameter part, which has a diameter larger than an inner diameter of the outer ring, opens outward in an axial direction, and has an axial width greater than an axial width of the shield. An outer shape surface of the shield is configured by a plurality of circular arcs having a same central angle and equidistantly arranged on a circumference and a plurality of chords connecting adjacent circular arcs each other. The shield is press-fitted and fixed to the large-diameter part.

Effects of the Invention

According to the present invention, since the shield is press-fitted to the bearing, it is possible to mount the metallic shield even to the outer ring having a small width of which am axial width is narrow. Also, the outer-diameter surface of the shield that is to be press-fitted to the bearing is configured by the plurality of circular arcs having the same central angle and equidistantly arranged on the circumference and the plurality of chords connecting the adjacent circular arcs each other. Therefore, since the press-fitting surface does not extend over the entire circumference, a press fitting area is small, so that deformation of the outer ring can be suppressed. Also, since the circular arc portions are equidistantly arranged on the circumference, it is possible to suppress the outer ring from being non-uniformly deformed. Accordingly, it is possible to mount the metallic shield even to the outer ring having a small thickness of which a radial width is narrow.

DETAILED DESCRIPTION OF EMBODIMENTS

Figure 1:
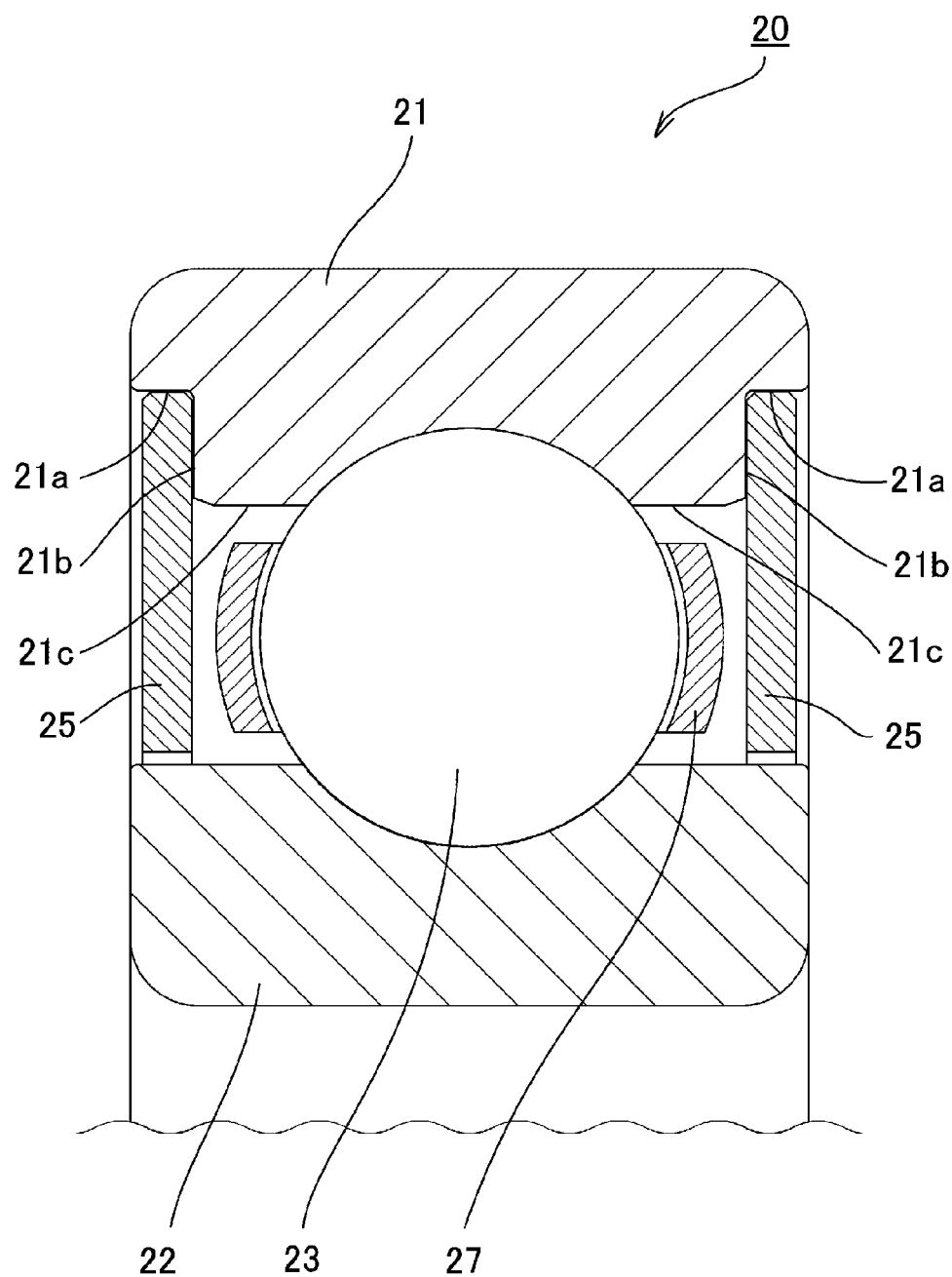
FIG. 1 is a sectional view of main parts of a rolling bearing in accordance with a first embodiment of the present invention.

Hereinafter, embodiments of the present invention will be described in detail with reference to the accompanying drawings. FIG. 1 is a sectional view of main parts of a rolling bearing 20 in accordance with a first embodiment of the present invention. The rolling bearing 20 includes an outer ring 21, an inner ring 22, which is an inner ring part, a plurality of balls 23, which are rolling elements provided between the inner and outer rings, a cage 27 configured to rollably hold the balls 23, and metallic shields 25 having a flat plate shape. Inner peripheral surfaces of both axial end portions of the outer ring 21 are provided with large-diameter parts 21a, each of which has a diameter larger than an inner diameter of an inner peripheral surface 21c (in the first embodiment, an inner peripheral surface of a shoulder part) of the outer ring 21, opens outward in an axial direction, and has an axial width greater than an axial width (thickness) of the shield 25.

Figure 2:
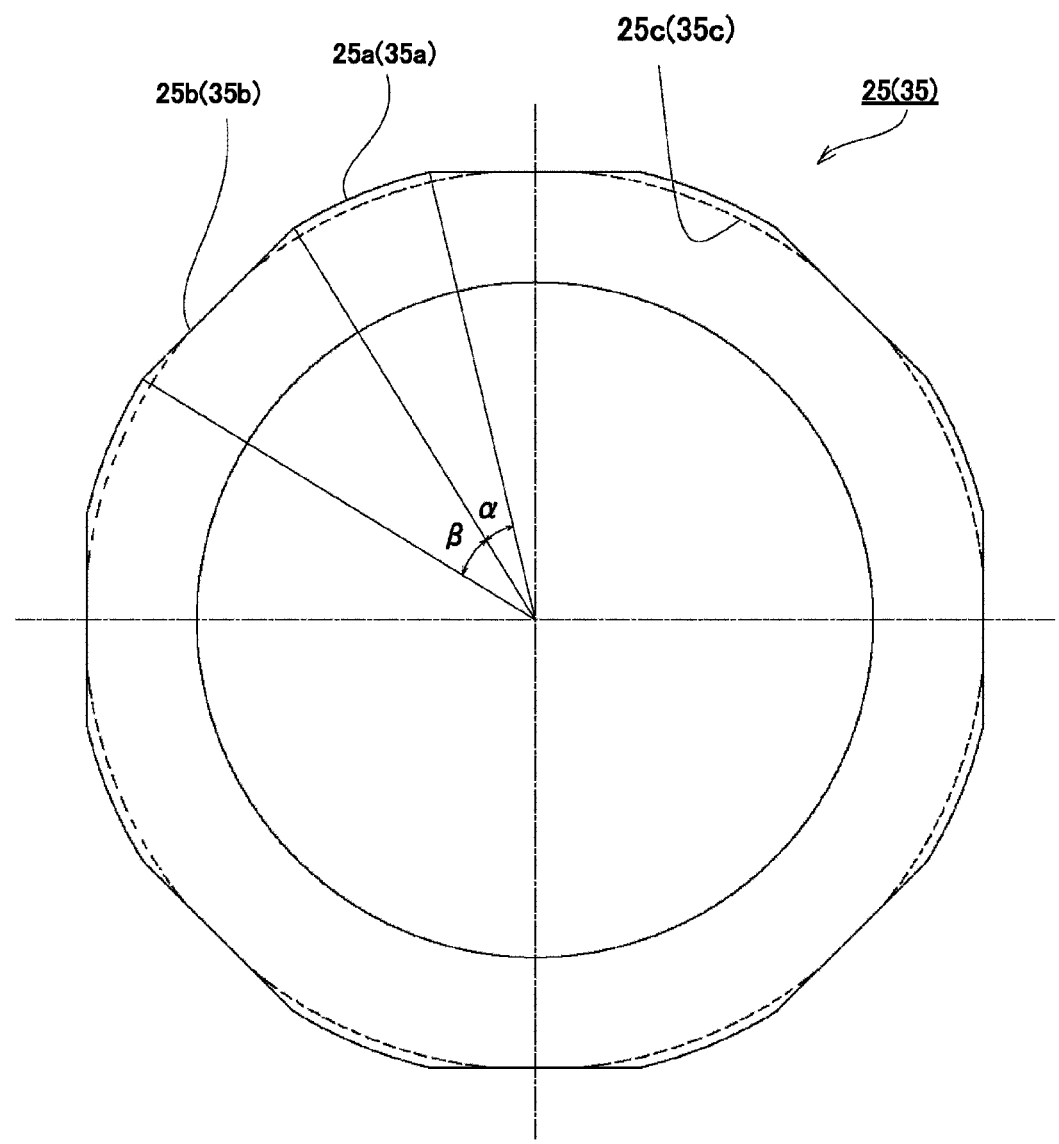
FIG. 2 depicts a shape of a shield relating to the present invention.

The shield 25 has a thin plate shape, like a flat washer having a constant thickness as shown in FIG. 2. As a material of the shield 25, for example, zinc, aluminum and magnesium are plated on SPCC. Also, an inner diameter of the shield 25 is set so that a labyrinth gap is to be formed between the the inner diameter of the shield 25 and an outer peripheral surface of the inner ring. In the meantime, an outer shape surface of the shield 25 is configured by a plurality of circular arcs 25a having the same central angle and equidistantly arranged on a circumference and a plurality of chords 25b connecting the adjacent circular arcs 25a each other. In the meantime, the central angles α of the respective circular arcs 25a are the same and the central angles β of the respective chords 25b are the same. However, the central angle α of the circular arc 25a and the central angle β of the chord 25b are not necessarily required to be the same.

Also, the central angle β of the chord 25b is designed greater than the central angle α of the circular arc 25a, so that a press-fitting area to the large-diameter part 21a of the outer ring 21 is reduced. As a result, when incorporating the rolling bearing 20 into a housing or the like, it is possible to suppress deformation of the outer ring 21 so as not to influence the incorporation.

The shield 25 is press-fitted and fixed so as to butt to an axially inner end face 21b of the large-diameter part 21a. That is, the large-diameter part 21a is provided so as to form the axially inner end face 21b for axially positioning the shield 25, and is preferably formed so that a minimum area of the axially inner end face 21b capable of determining a press-fitting position is to be secured. The shield 25 is formed to be axially symmetric. Therefore, upon the press-fitting, it is not necessary to distinguish a front surface and a back surface, so that it is possible to easily perform the assembling. Also, since the shield 25 is configured by the plurality of circular arcs 25a having the same central angle and equidistantly arranged on the circumference and the plurality of chords 25b connecting the adjacent circular arcs 25a each other, the shield can be mounted to the outer ring 21 in any phase and can be easily assembled. In the meantime, the press-fitting force, the pulling-out force, a degree of deformation of an outer diameter and the like are changed by the axial width of the shield 25, the number and central angle of the circular arcs and a diameter of the large-diameter part 21a relative to a diameter of the circular arc. Therefore, optimal values of dimensions of the respective parts are preferably set by a test and the like, considering a dimension of the outer ring of the bearing, a pulling-out force to be required, an allowable amount of deformation of an outer shape, and the like.

An inscribed circle 25c of the respective chords 25b of the shield 25 preferably has a diameter larger than the inner diameter of the inner peripheral surface 21c of the outer ring 21. Also, the axially inner end face 21b of the large-diameter part 21a is preferably a flat surface so that a gap is not to be formed between the axially inner end face 21b and the shield 25. Thereby, it is possible to prevent introduction of foreign matters and grease leakage from a gap between the large-diameter part 21a of the outer ring and a radially outer side of the chord 25b of the shield 25. However, when the gap is small even though it exists, the gap becomes a labyrinth gap, so that it is possible to prevent the introduction of foreign matters and the grease leakage. Therefore, when the gap is inevitably formed, the gap is preferably set as small as possible.

Figure 3A:
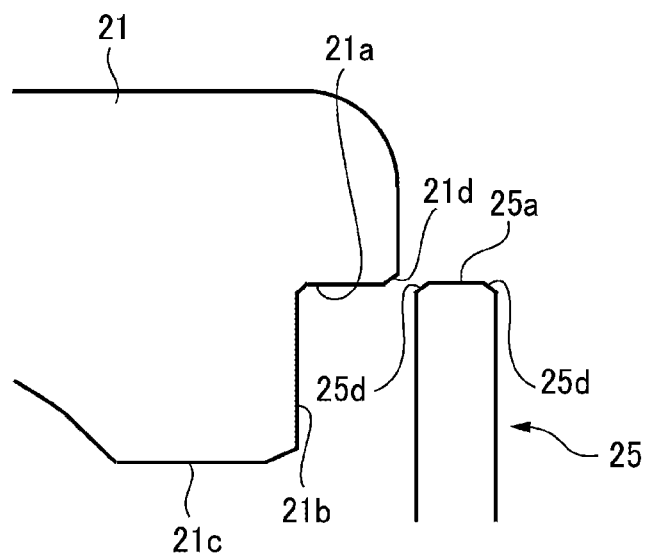
FIG. 3A is a sectional view of main parts depicting a first example where pressing introduction portions are provided at edge portions between axial end faces and an outer shape surface of the shield and at an edge portion between an axial end face and a large-diameter part of an outer ring.
Figure 3B:
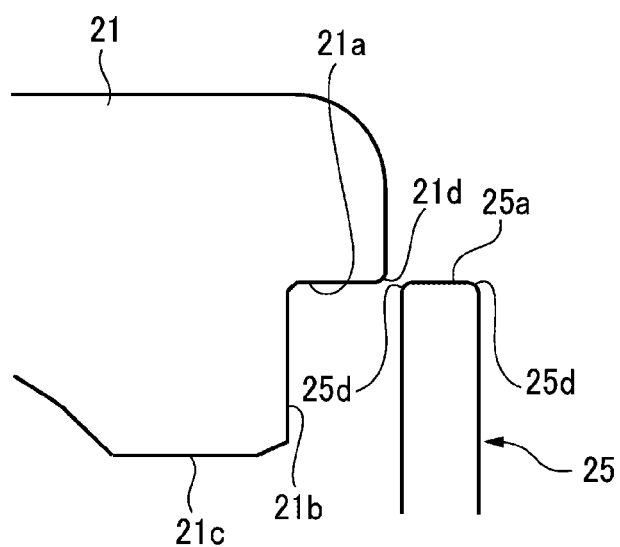
FIG. 3B is a sectional view of main parts depicting a second example where the pressing introduction portions are provided at the edge portions between the axial end faces and the outer shape surface of the shield and at the edge portion between the axial end face and the large-diameter part of the outer ring.
Figure 4:
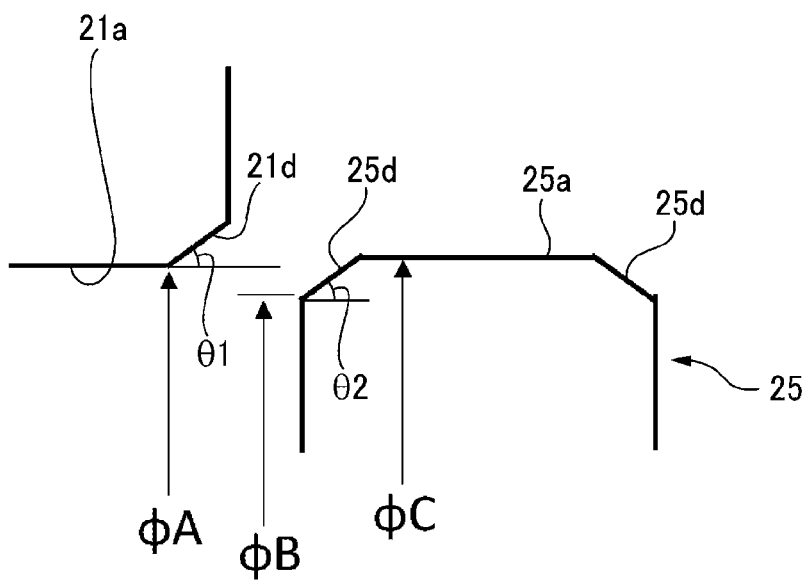
FIG. 4 is an enlarged view of main parts depicting a dimension relation of the pressing introduction portions in the first example of FIG. 3A.
Figure 5:
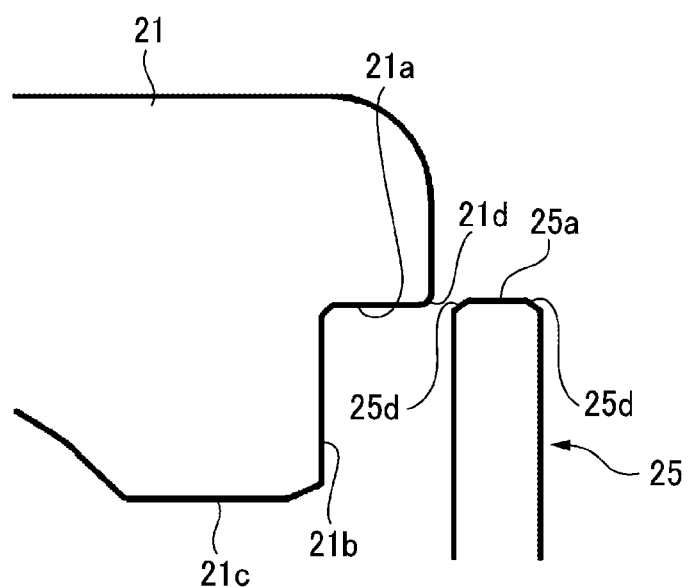
FIG. 5 is a sectional view of main parts depicting a third example where the pressing introduction portions are provided at the edge portions between the axial end faces and the outer shape surface of the shield and at the edge portion between the axial end face and the large-diameter part of the outer ring.

Also, as shown in FIGS. 3 to 5, at least one of edge portions between axial end faces and an outer shape surface of the shield 25 and an edge portion between an axial end face and the large-diameter part 21a of the outer ring 21 is preferably provided with pressing introduction portions 21d, 25d. Thereby, when press-fitting and fixing the shield 25 to the large-diameter part 21a of the outer ring 21, it is possible to prevent situations where the edge portions between the axial end faces and the outer shape surface of the shield 25 are cut, foreign matters are generated and an interference is reduced and the shield 25 is thus separated.

Also, a taper shape, a convex curve-shaped section (curved shape) or a combination thereof can be applied to the pressing introduction portion 21d of the outer ring 21 and the pressing introduction portion 25d of the shield 25. When the taper shape is applied, taper angles θ1, θ2 are preferably 45° or lower (refer to FIG. 4).

Specifically, as shown in FIG. 3A, the pressing introduction portion 21d of the outer ring 21 and the pressing introduction portion 25d of the shield 25 may be formed to have the taper shape or as shown in FIG. 3B, the pressing introduction portion 21d of the outer ring 21 and the pressing introduction portion 25d of the shield 25 may be formed to have the convex curve-shaped section (curved shape).

Also, when the pressing introduction portion 21d of the outer ring 21 and the pressing introduction portion 25d of the shield 25 are formed to have the taper shape, as shown in FIG. 4, a dimension relation of ϕB<ϕA<ϕC is preferably satisfied where ϕA indicates a diameter at a boundary part between the large-diameter part 21a and the pressing introduction portion 21d of the outer ring 21, ϕB indicates a dimeter at a boundary part between the axial end face and the pressing introduction portion 25d of the shield 25 and ϕC indicates a diameter of the circular arc 25a of the shield 25, from standpoints of easy press-fitting and secure press-fitting.

Also, as shown in FIG. 5, the pressing introduction portion 21d of the outer ring 21 may be formed to have the convex curve-shaped section, and the pressing introduction portion 25d of the shield 25 may be formed to have the taper shape. Since the shield 25 has a small thickness, the pressing introduction portion 25d of the taper shape can be easily machined. Also, the pressing introduction portion 21d of the outer ring 21 having the convex curve-shaped section can be easily machined by grinding, and the shield 25 having the pressing introduction portion 25d of the taper shape can be well inserted.

Also, the pressing introduction portions 25d of the shield 25 are provided at both the edge portions between both axial end faces and the outer shape surface, so that it is not necessary to distinguish the front surface and back surface of the shield 25 upon the press-fitting and the shield can be easily mounted.

In the meantime, in order to form the shield 25 to be axially symmetric and to remove burrs, the chord 25b is also punched from one axial side by a press machine and is then chamfered. The pressing introduction portions 25d are formed at the circular arc 25a after the chamfering.

Also, the shield 25 shown in FIG. 2 has a substantially octagonal shape configured by the eight circular arcs 25a and the eight chords 25b. However, the shield 25 of the present invention is not limited thereto, and may be a substantially polygonal shape of a substantial hexagon or more configured by the six circular arcs 25a and the six chords 25b.

In any case, it is required that an outer diameter at a mid-point of the chord 25b is smaller than the inner diameter of the inner peripheral surface 21c of the outer ring 21 and a gap is not generated between the chord 25b and the inner peripheral surface of the outer ring 21. Therefore, as described above, the inscribed circle 25c of the respective chords 25b of the shield 25 has preferably the diameter greater than the inner diameter of the inner peripheral surface 21c of the outer ring 21.

Figure 6:
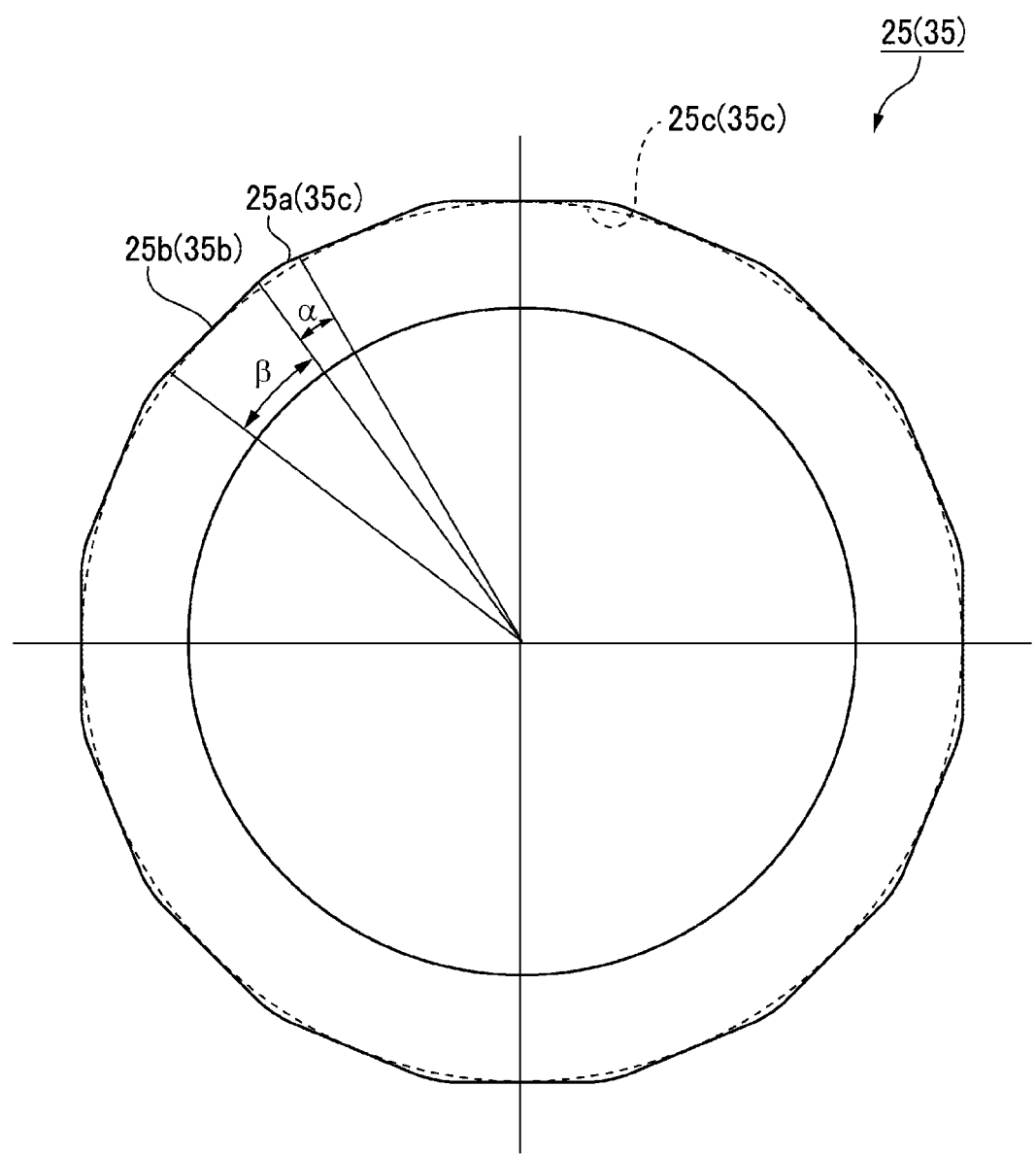
FIG. 6 depicts a shape of another shield relating to the present invention.

For example, the shield 25 shown in FIG. 6 is a substantial hexadecagon configured by the sixteen circular arcs 25a and the sixteen chords 25b where the central angles α, β are set so that the appropriate press-fitting area is to be secured and the inscribed circle 25c of the respective chords 25b of the shield 25 has a diameter greater than the inner diameter of the inner peripheral surface 21c of the outer ring 21. Also in this case, the central angle β of the chord 25b is preferably designed greater than the central angle α of the circular arc 25a.

Specifically, the central angle α of the circular arc 25a is set to 3.5°, the central angle β of the chord 25b is set to 19°,
so that a sum of the central angles α, β of the circular arc 25a and the chord 25b is 22.5°. However, actually, considering a dimension tolerance, the central angle α of the circular arc 25a is set within a range of 2 to 7°, and the central angle β of the chord 25b is set within a range of 15 to 22°.

In the meantime, as a pressing interference, 2 μm is set. However, since the dimension tolerance of the shield 25 is ±35 μm and the dimension tolerance of the large-diameter part 21a of the outer ring 21 is ±25 μm, the actual pressing interference is 2 to 62 μm.

Also, in the first embodiment, the example where the outer ring 21 is provided with the large-diameter part 21a has been described. However, the shield 25 may be press-fitted to the inner peripheral surface 21c of the outer ring 21 without providing the large-diameter part 21a. Also, in the first embodiment, the example where the shields 25 are provided at both axial sides has been described. However, the shield 25 may be provided only at one axial side.

Figure 7:
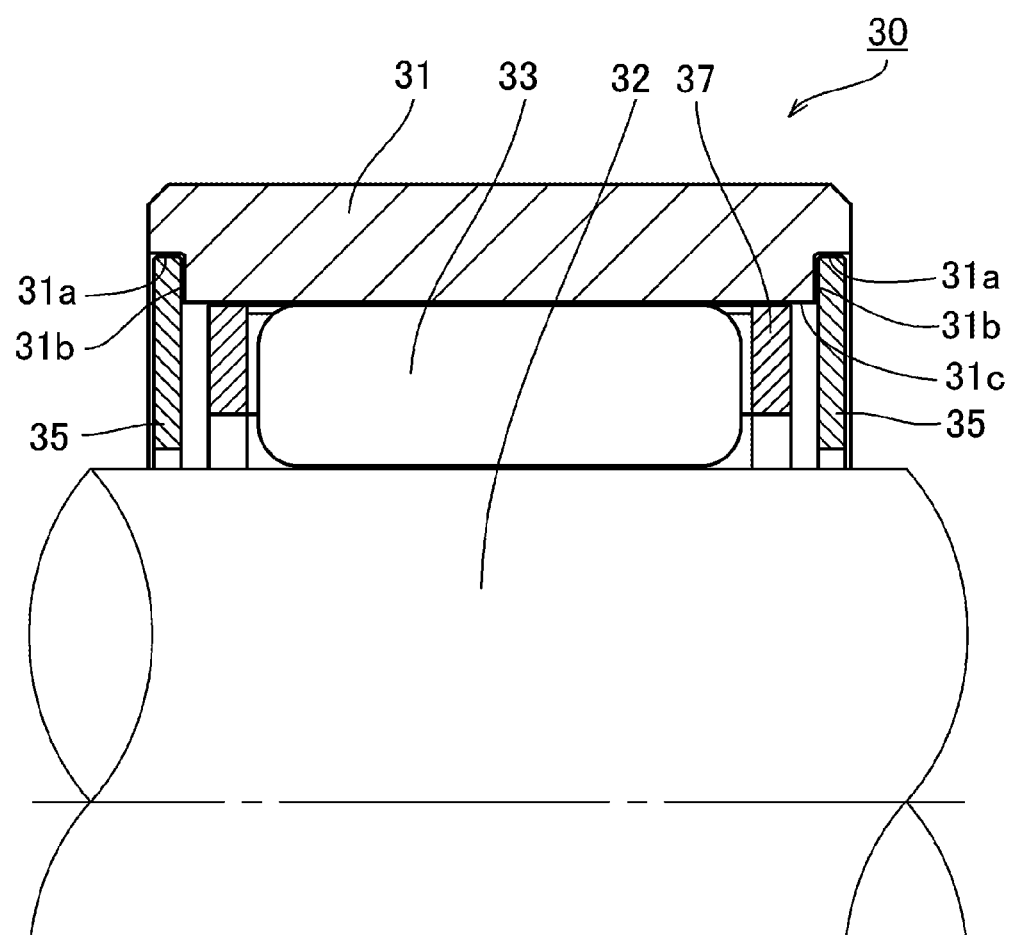
FIG. 7 is a sectional view of main parts of a rolling bearing in accordance with a second embodiment of the present invention.
Figure 8A:
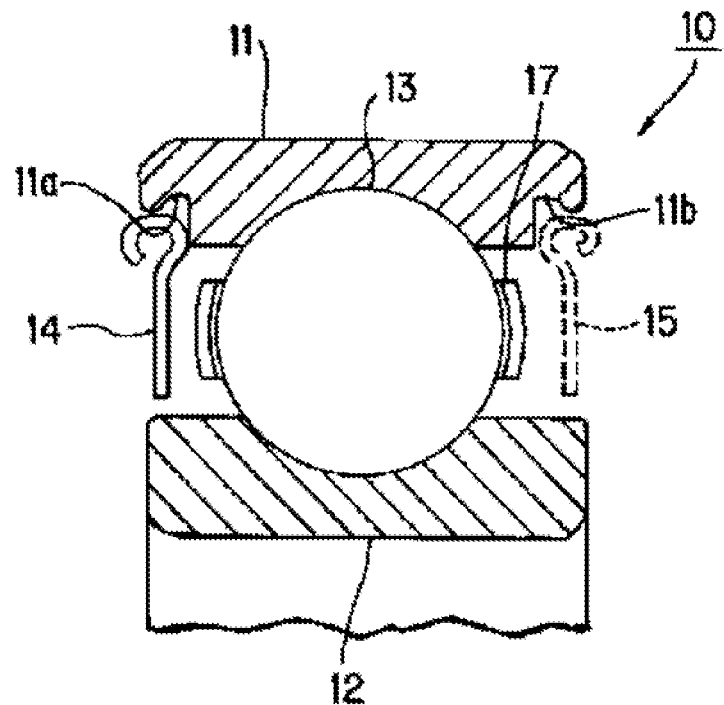
FIGS. 8A and 8B are sectional views of main parts of a rolling bearing of the related art, illustrating a method of mounting a shield of the related art.
Figure 8B:
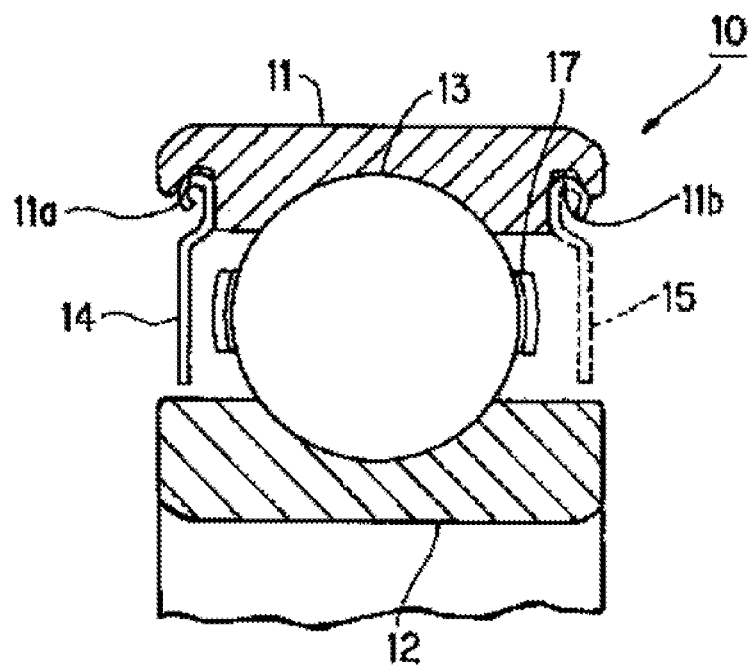

FIG. 7 is a sectional view of main parts of a rolling bearing 30 in accordance with a second embodiment of the present invention. As shown in FIG. 7, the rolling bearing 30 includes an outer ring 31, a plurality of rollers 33, which are the rolling elements, a cage 37 configured to rollably hold the rollers 33, and metallic shields 35 having a flat plate shape. Inner peripheral surfaces of both axial end portions of the outer ring 31 are provided with large-diameter parts 31a, each of which has a diameter larger than an inner diameter of the outer ring 31, opens outward in the axial direction, and has an axial width greater than an axial width (thickness) of the shield 35.

The shield 35 has a thin plate shape, like a flat washer having a constant thickness as shown in FIG. 2, and an inner diameter thereof is set so that a labyrinth gap is to be formed between the shield and an outer peripheral surface of a support shaft 32, which is an inner ring part. An outer shape surface of the shield 35 is configured by a plurality of circular arcs 35a having the same central angle and equi-distantly arranged on a circumference and a plurality of chords 35b connecting the adjacent circular arcs 35a each other. In the meantime, the central angles α of the respective circular arcs 35a are the same and the central angles of the respective chords 35b are the same. However, the central angle α of the circular arc 35a and the central angle β of the chord 35b are not necessarily required to be the same.

Also, the central angle β of the chord 35b is designed greater than the central angle α of the circular arc 35a, so that a press-fitting area to the large-diameter part 31a of the outer ring 31 is reduced. As a result, when incorporating the rolling bearing 30 into a housing or the like, it is possible to suppress deformation of the outer ring 31 so as not to influence the incorporation.

The shield 35 is press-fitted and fixed so as to butt to an axially inner end face 31b of the large-diameter part 31a. That is, the large-diameter part 31a is provided so as to form the axially inner end face 31b for axially positioning the shield 35, and is preferably formed so that a minimum area of the axially inner end face 31b capable of determining a press-fitting position is to be secured. In the meantime, the press-fitting force, the pulling-out force, a degree of deformation of an outer diameter and the like are changed by the axial width of the shield 35, the number and central angle of the circular arcs and a diameter of the large-diameter part 31a relative to a diameter of the circular arc. Therefore, optimal values of dimensions of the respective parts are preferably set by a test and the like, considering a dimension of the outer ring of the bearing, a pulling-out force to be required, an allowable amount of deformation of an outer shape, and the like.

An inscribed circle 35c of the respective chords 35b of the shield 35 preferably has a diameter larger than the inner diameter of the outer ring. Also, the axially inner end face 31b of the large-diameter part 31a is preferably a flat surface so that a gap is not to be formed between the axially inner end face and the shield 35. Thereby, it is possible to prevent introduction of foreign matters and grease leakage from a gap between the large-diameter part 31a of the outer ring and a radially outer side of the chord 35b of the shield 35. However, when the gap is small even though it exists, the gap becomes a labyrinth gap, so that it is possible to prevent the introduction of foreign matters and the grease leakage. Therefore, when the gap is inevitably formed, the gap is preferably set as small as possible.

In the second embodiment, the example where the outer ring 31 is provided with the large-diameter part 31a has been described. However, the shield 35 may be press-fitted to the inner peripheral surface 31c of the outer ring without providing the large-diameter part 31a. Also, in the second embodiment, the example where the shields 35 are provided at both axial sides has been described. However, the shield 35 may be provided only at one axial side. Also, in the bearing 30 of the second embodiment, the outer peripheral surface of the support shaft 32 equivalent to the inner ring is used as a raceway. However, a rolling bearing having an inner ring is also possible.

The present invention is not limited to the above embodiments, and can be appropriately modified and improved. For example, in the above embodiments, the outer shape surface of the shield is configured by the plurality of circular arcs and the plurality of chords connecting the adjacent circular arcs each other. However, instead of the chord, a V-shaped cutout may also be used. Also, the rolling bearing of the present invention can be applied as a support bearing of a ball screw.

As described above, the present disclosure discloses following matters:

(1) A rolling bearing comprising:
an outer ring;
an inner ring part;
a plurality of rolling elements;
a cage configured to rollably hold the plurality of rolling elements, and
a shield,
wherein an inner peripheral surface of at least one axial end portion of the outer ring is provided with a large-diameter part, which has a diameter larger than an inner diameter of the outer ring, opens outward in an axial direction, and has an axial width greater than an axial width of the shield,
wherein an outer shape surface of the shield is configured by a plurality of circular arcs having a same central angle and equidistantly arranged on a circumference and a plurality of chords connecting adjacent circular arcs each other, and
wherein the shield is press-fitted and fixed to the large-diameter part.

(2) The rolling bearing according to (1),
wherein a central angle of the chord is greater than a central angle of the circular arc.

(3) The rolling bearing according to (1) or (2),
wherein at least one of (a) an edge portion between an axial end face and the outer shape surface of the shield and (b) an edge portion between an axial end face and the large-diameter part of the outer ring is provided with a pressing introduction portion.

(4) The rolling bearing according to (3),
wherein the pressing introduction portion has a taper shape or a convex curve-shaped section.

(5) The rolling bearing according to (3),
wherein both (a) the edge portion between the axial end face and the outer shape surface of the shield and (b) the edge portion between the axial end face and the large-diameter part of the outer ring are formed with the pressing introduction portion having a taper shape, and
wherein when a diameter at a boundary part between the large-diameter part and the pressing introduction portion of the outer ring is $\phi A$, a dimeter at a boundary part between the axial end face and the pressing introduction portion of the shield is $\phi B$, and a diameter of the circular arc of the shield is $\phi C$, a dimension relation of $\phi B < \phi A < \phi C$ is satisfied.

(6) The rolling bearing according to (3),
wherein the edge portion between the axial end face and the large-diameter part of the outer ring is formed with the pressing introduction portion having a convex curve-shaped section, and
wherein the edge portion between the axial end face and the outer shape surface of the shield is formed with the pressing introduction portion having a taper shape.

(7) The rolling bearing according to one of (3) to (6),
wherein both edge portions between both axial end faces and the outer shape surface of the shield are provided with the pressing introduction portion.

(8) The rolling bearing according to one of (1) to (7),
wherein a labyrinth gap is formed between an inner-diameter surface of the shield and an outer shape surface of the inner ring part.

(9) The rolling bearing according to one of (1) to (8),
wherein the large-diameter part of the outer ring is formed with an axially inner end face for axially positioning the shield.

The subject application is based on Japanese Patent Application No. 2017-031662 filed on Feb. 23, 2017, the contents of which are incorporated herein by reference.

DESCRIPTION OF REFERENCE NUMERALS 10, 20, 30: rolling bearing
11, 21, 31: outer ring
21a, 31a: large-diameter part
21b, 31b: axially inner end face
21c, 31c: inner peripheral surface
21d, 25d: pressing introduction portion
12, 22: inner ring (inner ring part)
32: support shaft (inner ring part)
13, 23, 33: rolling element
14, 15, 25, 35: shield
25a, 35a: circular arc
25b, 35b: chord
25c, 35c: inscribed circle of chord
27: cage
α: central angle of circular arc
β: central angle of chord

The invention claimed is:
1. A rolling bearing comprising:
an outer ring;
an inner ring part;
a plurality of rolling elements;
a cage configured to rollably hold the plurality of rolling elements, and
a shield, wherein an inner peripheral surface of at least one axial end portion of the outer ring is provided with a large-diameter part, which has a diameter larger than an inner diameter of the outer ring, opens outward in an axial direction, and has an axial width greater than an axial width of the shield, wherein an outer shape surface of the shield is configured by a plurality of circular arcs having a same central angle and equidistantly arranged on a circumference and a plurality of chords respectively connecting adjacent circular arcs, and wherein the shield is press-fitted and fixed to the large-diameter part.

2. The rolling bearing according to claim 1, wherein a central angle of the chord is greater than the central angle of the circular arc.

3. The rolling bearing according to claim 1, wherein at least one of (a) an edge portion between an axial end face and the outer shape surface of the shield and (b) an edge portion between an axial end face and the large-diameter part of the outer ring is provided with a pressing introduction portion.

4. The rolling bearing according to claim 3, wherein the pressing introduction portion has a taper shape or a convex curve-shaped section.

5. The rolling bearing according to claim 3, wherein both (a) the edge portion between the axial end face and the outer shape surface of the shield and (b) the edge portion between the axial end face and the large-diameter part of the outer ring are formed with the pressing introduction portion having a taper shape, and wherein when a diameter at a boundary part between the large-diameter part and the pressing introduction portion of the outer ring is ϕA, a dimeter at a boundary part between the axial end face and the pressing introduction portion of the shield is ϕB, and a diameter of the circular arc of the shield is ϕC, a dimension relation of ϕB<ϕA<ϕC is satisfied.

6. The rolling bearing according to claim 3, wherein the edge portion between the axial end face and the large-diameter part of the outer ring is formed with the pressing introduction portion having a convex curve-shaped section, and wherein the edge portion between the axial end face and the outer shape surface of the shield is formed with the pressing introduction portion having a taper shape.

7. The rolling bearing according to claim 3, wherein both edge portions between both axial end faces and the outer shape surface of the shield are provided with the pressing introduction portion.

8. The rolling bearing according to claim 1, wherein a labyrinth gap is formed between an inner-diameter surface of the shield and an outer shape surface of the inner ring part.

9. The rolling bearing according to claim 1, wherein the large-diameter part of the outer ring is formed with an axially inner end face for axially positioning the shield.

\* \* \* \* \*